(12) United States Patent
Gulsen

(10) Patent No.: US 10,606,906 B1
(45) Date of Patent: Mar. 31, 2020

(54) SUMMARY BASED PRIVACY SECURITY FOR BENCHMARKING

(71) Applicant: Workday, Inc., Pleasanton, CA (US)

(72) Inventor: Denis Gulsen, Redwood City, CA (US)

(73) Assignee: Workday, Inc., Pleasanton, CA (US)

( * ) Notice: Subject to any disclaimer, the term of this patent is extended or adjusted under 35 U.S.C. 154(b) by 222 days.

(21) Appl. No.: 15/693,790

(22) Filed: Sep. 1, 2017

(51) Int. Cl.
*G06F 16/951* (2019.01)
*H04L 29/06* (2006.01)

(52) U.S. Cl.
CPC ........ *G06F 16/951* (2019.01); *H04L 63/1433* (2013.01); *H04L 63/105* (2013.01)

(58) Field of Classification Search
CPC .. G06F 16/951; H04L 63/1433; H04L 63/105
See application file for complete search history.

(56) References Cited

U.S. PATENT DOCUMENTS

| | | | |
|---|---|---|---|
| 8,578,501 B1 * | 11/2013 | Ogilvie | H04L 67/10 726/26 |
| 8,646,030 B2 * | 2/2014 | Hu | G06F 21/604 726/1 |
| 9,202,026 B1 * | 12/2015 | Reeves | G06F 21/30 |
| 9,377,991 B1 | 6/2016 | Rapport | |
| 10,181,043 B1 * | 1/2019 | Pauley, Jr. | H04L 63/04 |
| 2009/0150362 A1 * | 6/2009 | Evenhaim | G06F 21/6254 |
| 2009/0254511 A1 * | 10/2009 | Yeap | G06F 21/6245 |
| 2009/0300716 A1 * | 12/2009 | Ahn | G06F 21/34 726/1 |
| 2011/0022681 A1 * | 1/2011 | Simeonov | G06Q 30/02 709/217 |
| 2013/0111545 A1 * | 5/2013 | Sharma | H04L 63/10 726/1 |
| 2014/0282949 A1 | 9/2014 | Nath | |
| 2014/0373182 A1 * | 12/2014 | Peri | G06F 21/6245 726/30 |
| 2017/0195307 A1 | 7/2017 | Jones-McFadden | |
| 2017/0270318 A1 * | 9/2017 | Ritchie | G06Q 40/025 |
| 2017/0332409 A1 | 11/2017 | Yerramalli | |
| 2018/0032748 A1 * | 2/2018 | Rueger | G06F 21/6218 |
| 2018/0262514 A1 * | 9/2018 | Hall | H04L 63/105 |
| 2018/0285596 A1 | 10/2018 | Jones | |

* cited by examiner

*Primary Examiner* — Techane Gergiso
(74) *Attorney, Agent, or Firm* — Van Pelt, Yi & James LLP

(57) ABSTRACT

A system for summary based privacy security for benchmarks including an interface and a processor. The interface is configured to receive an indication to opt-in to a benchmark category from a tenant, where opting-in includes a privacy level. The interface is also configured to provide a benchmark data request to a tenant system, where the benchmark data request includes a requirement to summarize tenant data for the benchmark data request compatible with the privacy level. The processor is configured to combine summarized tenant data with prior commingled benchmark data to update a commingled benchmark database, where the commingled benchmark database includes data from a plurality of tenants. The processor is also configured to determine a benchmark compatible with the privacy level using the commingled benchmark database.

18 Claims, 11 Drawing Sheets

600

| Summarization/Obfuscation Table | | |
|---|---|---|
| Privacy Level | Data Summarization Function | Report Obfuscation Function |
| 5 | Mean | Mean |
| 4 | Mean; Standard Deviation; Min and Max | Mean; Standard Deviation |
| 3 | Mean; Quartile Values | Mean; Standard Deviation; Min and Max |
| 2 | Mean; Decile Values | Mean; Quartile Values |
| 1 | All Data Shared | Mean; Decile Values |

Fig. 6

SUMMARY BASED PRIVACY SECURITY FOR BENCHMARKING

BACKGROUND OF THE INVENTION

On a software as a service platform, tenant data is strictly segregated in order to maintain separation of data belonging to different tenants. Tenant data is stored on a set of data partitions securely separated by tenant (e.g., on different computers, on different hard drives, on different virtual machines, etc.) in order to prevent users from accessing data belonging to other tenants. In some situations, tenants wish to share data for comparison purposes or to get a more complete view of a situation (e.g., salary surveys or other industry benchmarks) and they provide a data set to a third party in exchange for access to the pooled set. However, the third party may require the tenant provide more detailed data than the tenant is comfortable with. This makes it more likely the tenant will choose not to use the service.

BRIEF DESCRIPTION OF THE DRAWINGS

Various embodiments of the invention are disclosed in the following detailed description and the accompanying drawings.

FIG. 6 is a diagram illustrating an embodiment of data summarization functions and report obfuscation functions associated with privacy levels.

DETAILED DESCRIPTION

Figure 1:
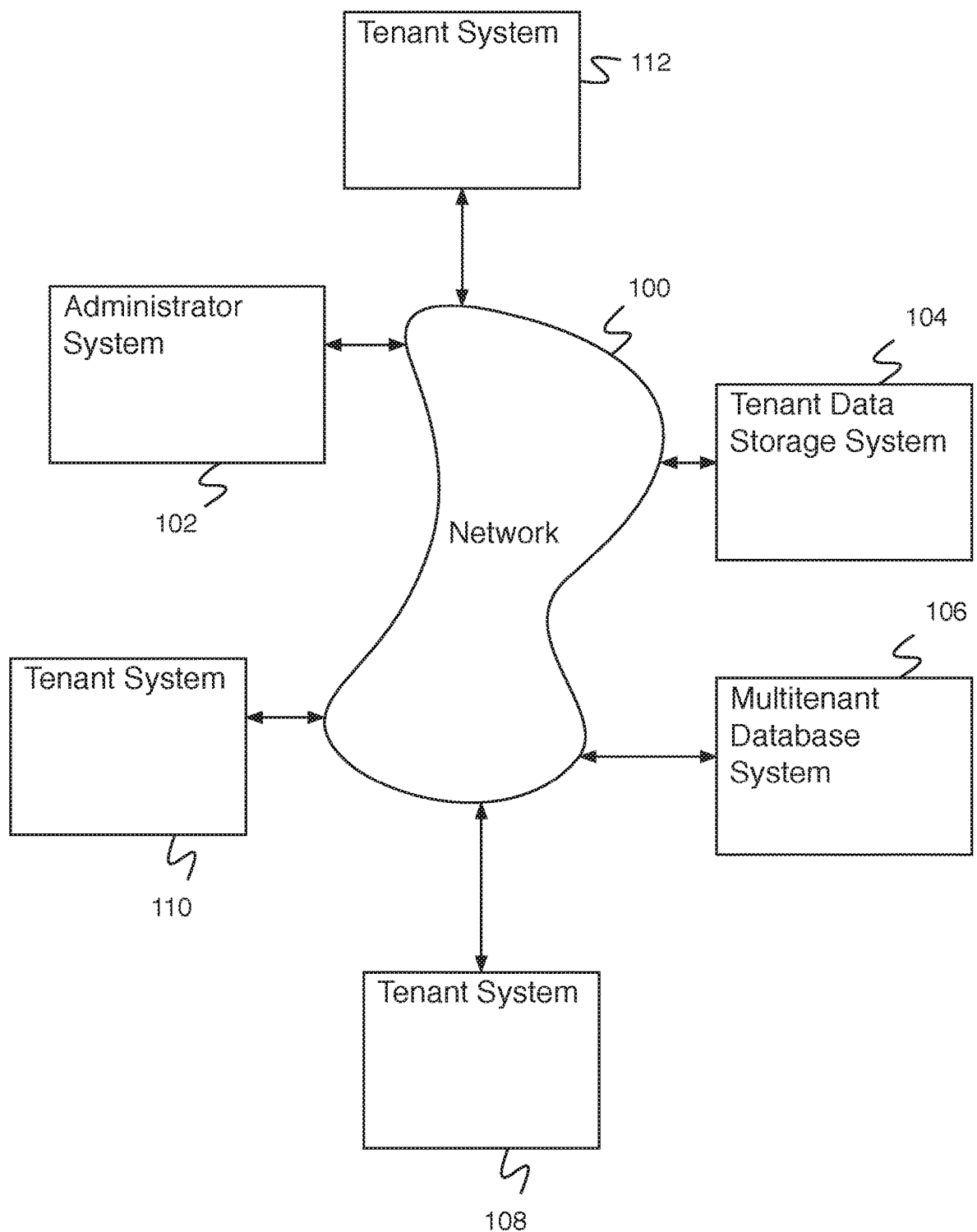
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for summary based privacy security for benchmarks is disclosed. The system comprises an interface and a processor. The interface is configured to receive an indication to opt-in to a benchmark category from a tenant, wherein opting-in includes a privacy level. The interface is further configured to provide a benchmark data request to a tenant system, wherein the benchmark data request includes a requirement to summarize tenant data for the benchmark data request compatible with the privacy level. The processor is configured to combine the summarized tenant data with prior commingled benchmark data to update a commingled benchmark database, wherein the commingled benchmark database includes data from a plurality of tenants. The processor is further configured to determine a benchmark compatible with the privacy level using the commingled benchmark database. In some embodiments, the system for summary based privacy security for benchmarks additionally comprises a memory coupled to the processor and configured to provide the processor with instructions.

A system for secure commingling of tenant isolated data comprises a set of tenant data storage units and a commingling storage unit. Tenant data for a tenant is stored for typical system use on a tenant data storage unit. A tenant has access to data stored on its associated tenant data storage unit but not to data stored on tenant data storage units associated with other tenants. A tenant is prompted to opt in to the secure data commingling system. In the event the tenant opts in, the tenant provides one or more privacy level indications (e.g., a plurality of privacy level indications each associated with a data category, or one privacy level indication associated with all tenant data). The privacy level indication indicates a data summarization function used to summarize the tenant data. Tenant data is summarized and then it is copied to the secure data commingling system. Because only summarized data is copied to the secure data commingling system, the tenant maintains privacy over their detailed (e.g., row-level) data.

The tenant is able to request benchmarking calculations to be performed on the data in the secure data commingling system—for example, number of years of employee tenure at an organization. After the benchmarking calculation is performed, the result data is obfuscated using an obfuscation function corresponding to the privacy level. The less (e.g., more summarized) data the tenant is willing to provide to the commingling storage unit, the less (e.g., more obfuscated) data the tenant receives in benchmarking calculations.

When a tenant provides summarized data to the secure data commingling system it is combined with previously stored commingled data. In order to effectively combine the summarized data, a representative tenant data set is determined (e.g., a pseudo data set with characteristics compatible with the summarized data, but with fine grained detail that is generated). The representative tenant data set comprises a data set that, when summarized, generates the tenant provided summarized data. The representative tenant data set can be stored in the secure data commingling system as though it is row-level (e.g., unsummarized) tenant data.

FIG. 1 is a block diagram illustrating an embodiment of a network system. In some embodiments, the network system of FIG. 1 comprises a system for summary based privacy security for benchmarking. In the example shown, tenant system 108, tenant system 110, and tenant system 112 store data in separate areas of tenant data storage system 104. This separation ensures that a given tenant's data is secure. However, there are times when it is useful to have access to have access to a pool of many tenants' data in exchange for providing access to the tenant's own data. Data that is part of the multitenant pool of data is stored either in tenant data storage system 104 in a comingling area or in multitenant database system 106. Multitenant database system 106 enables access to the multitenant pool of data as part of a service (e.g., a benchmarking service that enables comparison of tenant data with a larger pool of data from other tenants).

A tenant can opt in to sharing data in exchange for access to the data pool and opting in enables multitenant database system 106 to access a copy of relevant data associated with the opt in plan and appropriately stripped of identification information. When a tenant opts in the tenant additionally provides a privacy level. The privacy level indicates a summarization requirement for transferring tenant data from the tenanted storage to a commingled storage. The summarization requirement indicates the extent to which data is required to be summarized before it is copied to the commingled storage (e.g., rather than providing a set of row data, a data mean is provided, a data mean and a standard deviation is provided, a data mean and quartile values are provided, etc.). Tenant data is summarized using a processor associated with the tenant (e.g., a processor of tenant system 108, tenant system 110, tenant system 112, a processor of tenant data storage system 104 associated with tenant stored data, etc.). Summarized tenant data is transferred to a commingled storage unit (e.g., commingled storage unit of tenant data storage system 104 or multitenant database system 106). The summarized tenant data is merged into the commingled data in the multitenant database. A processor associated with the commingled data (e.g., a processor of tenant data storage system 104 or multitenant database system 106) is used to expand the summarized tenant data to create a set of single entries with summary characteristics of the summarized tenant data. The set of single entries is then merged into the commingled data to update data available for multitenant database calculations. Administrator system 102 is able to administrate different components of the system including multitenant database system 106.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer organization data). Tenant data storage system 104 comprises a plurality of tenant data storage units for storing tenant data isolated by tenant, and in some cases, a commingling storage unit for storing commingled tenant data. Multitenant database system 106 comprises a database system for providing tenant user access to data stored on either in a comingling storage unit of tenant data storage system 104 or in multitenant database system 106 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Tenant data storage system 104 comprises a tenant data storage system for storing data in a database for a set of tenants. Tenant data storage system 104 comprises a set of distinct tenanted storage systems (for example—separate hard drives, separate virtual machines, etc.) for storing tenant data in such a way that tenants cannot access each other's data. Tenant data storage system 104 additionally comprises a secure data commingling system for managing data transfer from the tenanted storage systems to the commingling storage and for executing data analyses and reporting on the commingling storage unit. Multitenant database system 106 comprises a system for performing database actions (e.g., storing data, modifying data, querying data, performing reports, etc.) on tenant data stored in a comingling storage area of either tenant data storage system 104 or multitenant database system 106. A secure data commingling system includes interfaces for transmitting and receiving tenant data (e.g., from one or more tenant data storage units to a comingling storage area). The secure data commingling system additionally comprises a processor for combining tenant data with prior commingled tenant data, and for determining a benchmark using the commingled benchmark database compatible with the privacy level.

Figure 2:
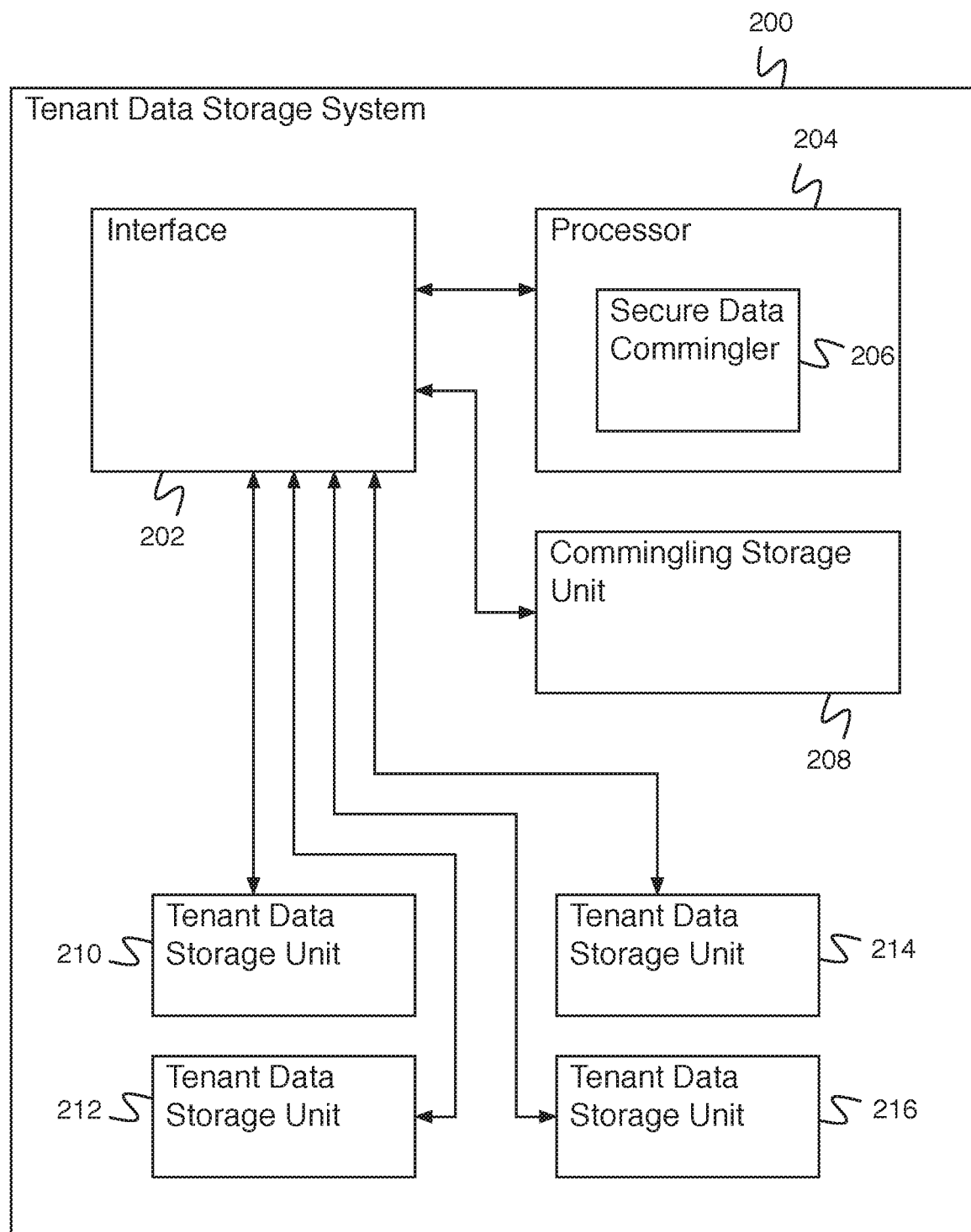
FIG. 2 is a block diagram illustrating an embodiment of a tenant data storage system.

FIG. 2 is a block diagram illustrating an embodiment of a tenant data storage system. In some embodiments, tenant data storage system 200 comprises tenant data storage system 104 of FIG. 1. In the example shown, tenant data storage system 200 is used to store different tenants' data in separate storage areas in tenant data storage unit 210, tenant data storage unit 212, tenant data storage unit 214, and tenant data storage unit 216. Each tenant has associated with it a separate storage area—for example, each tenant data storage unit could be entirely associated with a different single tenant. The plurality of tenant data storage units serves to store data associated with different tenants. Tenant data storage system 200 comprises any appropriate number of tenant data storage units. Tenant data storage system 200 additionally comprises commingling storage unit 208 for commingling a portion of tenant data. Tenant data storage system 200 additionally comprises secure data commingler 206. Tenant data storage system 200 comprises processor 204 and interface 202. Interface 202 comprises an interface for receiving requests to provide or store tenant data (e.g., to and from tenant data storage unit 210, from tenant data storage unit 212, from tenant data storage unit 214, or from tenant data storage unit 216), for providing and receiving tenant data to be commingled in commingling storage unit 208, for receiving an indication to opt-in to a benchmark category from a tenant, for receiving a privacy level, for providing a benchmark data request to a tenant system, for providing a requirement to summarize tenant data from the benchmark request compatible with the privacy level to a tenant system, etc.

Secure data commingler 206 of processor 204 is configured to build a database stored in commingling storage unit 208 using commingled data stored on commingling storage unit 208. Secure data commingler 206 combines received benchmark data with prior commingled benchmark data to update the database. Secure data commingler 206 additionally determines benchmark data compatible with a privacy level using the database.

In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Figure 3:
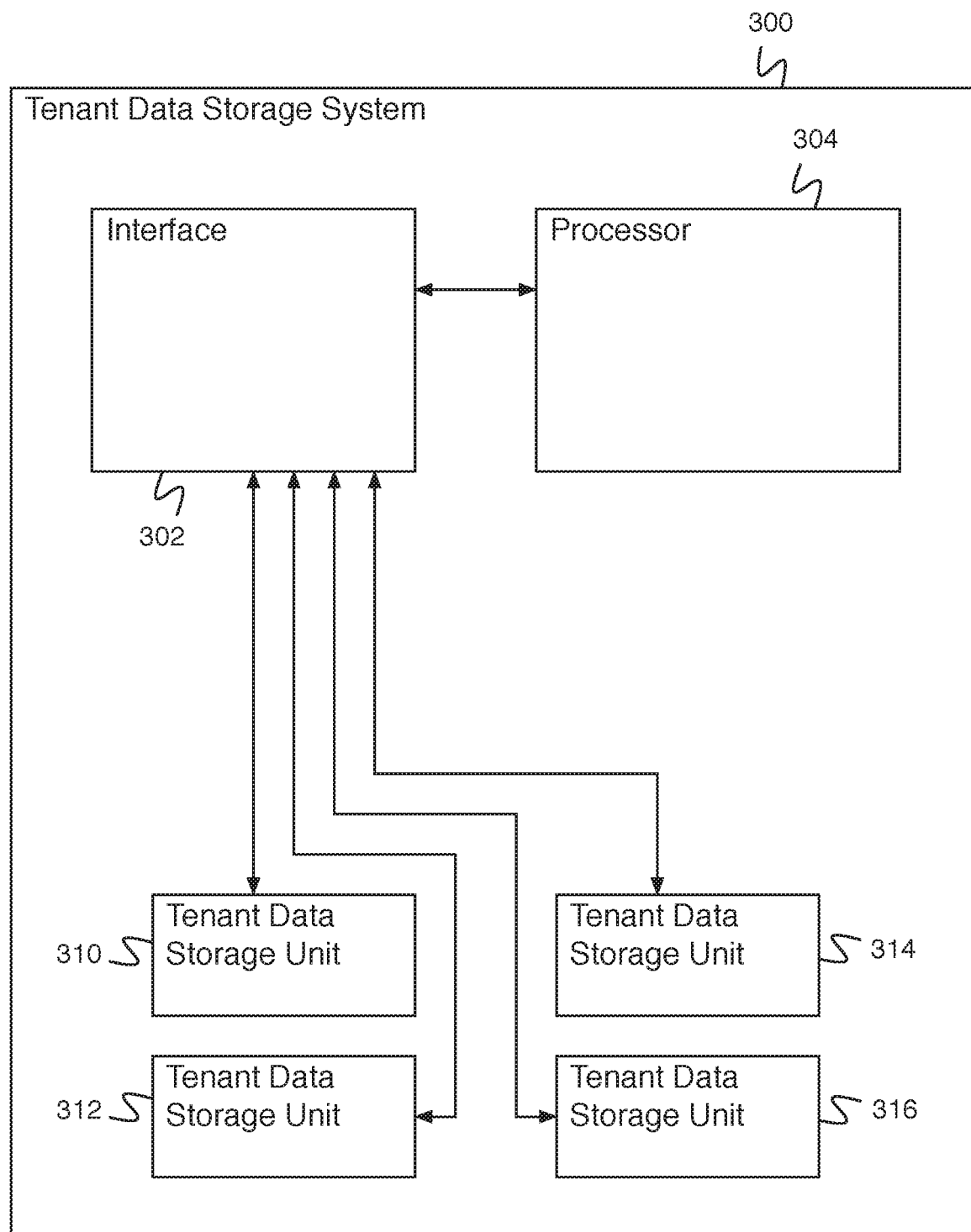
FIG. 3 is a block diagram illustrating an embodiment of a tenant data storage system.

FIG. 3 is a block diagram illustrating an embodiment of a tenant data storage system. In some embodiments, tenant data storage system 300 comprises tenant data storage system 104 of FIG. 1. In the example shown, tenant data storage system 300 is used to store different tenants' data in separate storage areas in tenant data storage unit 310, tenant data storage unit 312, tenant data storage unit 314, and tenant data storage unit 316. Each tenant has associated with it a separate storage area—for example, each tenant data storage unit could be entirely associated with a different single tenant. The plurality of tenant data storage units serves to store data associated with different tenants. Tenant data storage system 300 comprises any appropriate number of tenant data storage units. Tenant data storage system 300 additionally is able to transfer tenant stored data to a commingling storage unit (not shown in FIG. 3) for commingling a portion of tenant data.

Tenant data storage system 300 comprises processor 304 and interface 302. Interface 302 comprises an interface for receiving requests to provide or store tenant data (e.g., to and from tenant data storage unit 310, from tenant data storage unit 312, from tenant data storage unit 314, or from tenant data storage unit 316), for providing and receiving tenant data to be commingled in a commingling storage unit, for receiving an indication to opt-in to a benchmark category from a tenant, for receiving a privacy level, for providing a benchmark data request to a tenant system, for providing a requirement to summarize tenant data from the benchmark request compatible with the privacy level to a tenant system, etc.

Secure data commingler of another system is configured to build a database stored in commingling storage unit using commingled data stored on the commingling storage unit. The secure data commingler combines received benchmark data with prior commingled benchmark data to update the database. The secure data commingler additionally determines benchmark data compatible with a privacy level using the database.

In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Figure 4:
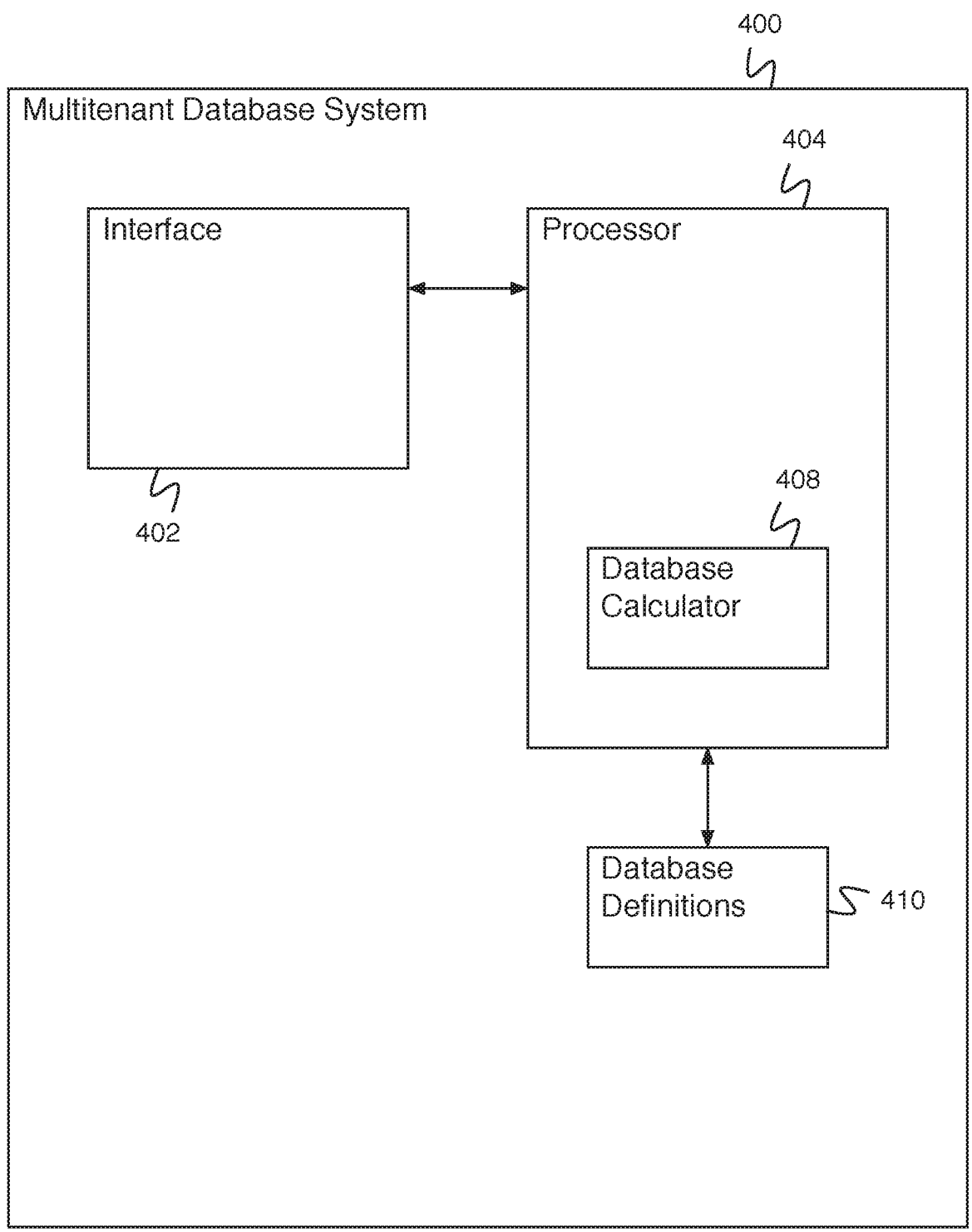
FIG. 4 is a block diagram illustrating an embodiment of a multitenant database system.

FIG. 4 is a block diagram illustrating an embodiment of a multitenant database system. In some embodiments, multitenant database system 400 is used to implement multitenant database system 106 of FIG. 1 with the tenant data storage system of FIG. 2. In the example shown, multitenant database system 400 receives a request, via interface 402, from a user for a service that uses multitenanted data. Database calculator 408 of processor 404 using database definitions 410 determines a report using data stored in a commingling storage unit and provides the report to the user. The data in the commingling storage unit is acquired using a secure data commingler from a number of tenant data storage units. Some data acquired by the commingling storage unit comprises summarized data. A tenant can opt into sharing data for use by a service (e.g., a benchmarking service), including a privacy level, and the data, summarized according to the privacy level, is transferred to a commingling storage unit.

Figure 5:
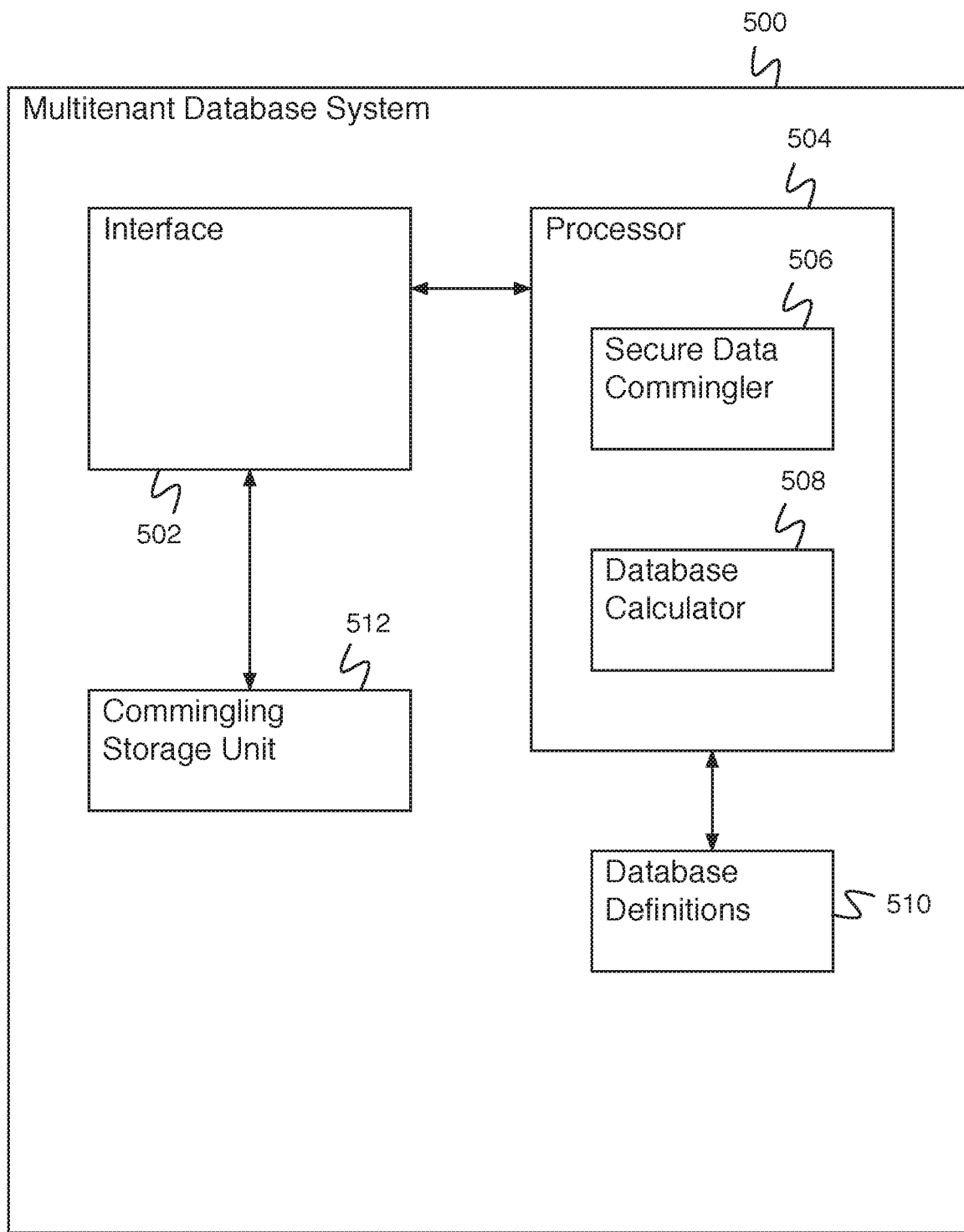
FIG. 5 is a block diagram illustrating an embodiment of a multitenant database system.

FIG. 5 is a block diagram illustrating an embodiment of a multitenant database system. In some embodiments, multitenant database system 500 is used to implement multitenant database system 106 of FIG. 1 with the tenant data storage system of FIG. 3. In the example shown, multitenant database system 500 receives a request, via interface 502, from a user for a service that uses multitenanted data. Database calculator 508 of processor 504 using database definitions 510 determines a report using data stored in a comingling storage unit (e.g., comingling storage unit 512) and provides the report to the user. The data in comingling storage unit 512 is acquired using secure data comingler 506 from a number of tenant data storage units. A tenant can opt into sharing data for use by a service (e.g., a benchmarking service), including a privacy level, and the data, summarized according to the privacy level, is transferred to a comingling storage unit (e.g., comingling storage unit 512). The data is transferred in some cases automatically when the data is updated so that the data stored in the comingling storage unit is always up to date.

In some embodiments, the commingling storage unit and the secure data commingler is split between two systems and in that case multitenant database system 500 of FIG. 5 can be used in conjunction with tenant data storage system of FIG. 2. In some cases, each of the two comingling storage units is operated by the associated collocated secure data commingler. Data for a report is separately retrieved from each comingling storage unit.

FIG. 6 is a diagram illustrating an embodiment of data summarization functions and report obfuscation functions associated with privacy levels. A data summarization function comprises a function performed by a tenant data storage system (e.g., tenant data storage unit 210 of FIG. 2) before data is transferred to a commingling storage unit (e.g., commingling storage unit 208 of FIG. 2). The data summarization function serves to protect the privacy of the tenant by reducing the amount of detail in the data transferred to the commingling storage unit. The report obfuscation function serves to reduce the amount of detail in the data provided to the tenant in benchmarking reports commensurately with the reduction in the amount of detail in the data transferred to the commingling storage unit. This encourages the tenant to share more detailed data with the commingling storage unit (e.g., to reduce the privacy level).

In the example shown, five privacy levels are defined. At privacy level 5, the data summarization function is mean (e.g., only the mean of a set of rows is provided for the data category) and the report obfuscation function is mean (e.g., reports only show the mean of data). At privacy level 4, the data summarization function is mean, standard deviation, min and max, and the report obfuscation function is mean and standard deviation. At privacy level 3, the data summarization function is mean and quartile values, and the report obfuscation function is mean, standard deviation, min and max. At privacy level 2, the data summarization function is mean and decile values, and the report obfuscation function is mean and quartile values. At privacy level 1, all row data is shared (e.g., there is no data summarization function), and the report obfuscation function is mean and decile values. In the example shown, the data summarization and report obfuscation function are the same for privacy level 5; for other privacy levels the report obfuscation function removes more detail than does the data summarization function (e.g., a tenant provides more data to the system than they receive in reports). In some embodiments, data summarization functions and report obfuscation functions are the same at all privacy levels. In some embodiments, the data summarization function removes more data than does the report obfuscation function at one or more privacy levels.

In some embodiments, a privacy level scheme may look like Yes or No; meaning the all row level information is returned or none is returned. In some embodiments, a privacy level scheme is to utilize a 3 privacy level scheme, where the return row contains all quantiles at level 1, at level 2 it returned 3 quantiles including median, and at level 3, no quantiles are returned only the number of participants are communicated back.

In some embodiments, a privacy level scheme involves using interpolated medians—for example, medians are calculated for a set of bin sizes and then medians are determined for the binned set of data. In this case, for example, rather than a tenant contributing row-level data, each employee's salary for instance, salaries are grouped into intervals varied by privacy level (privacy level 2 is a $10 interval, privacy level 3 is $100 interval, privacy level 4 is $1000 interval, etc.) and these values are used, after grouping, to determine a median value.

Figure 7:
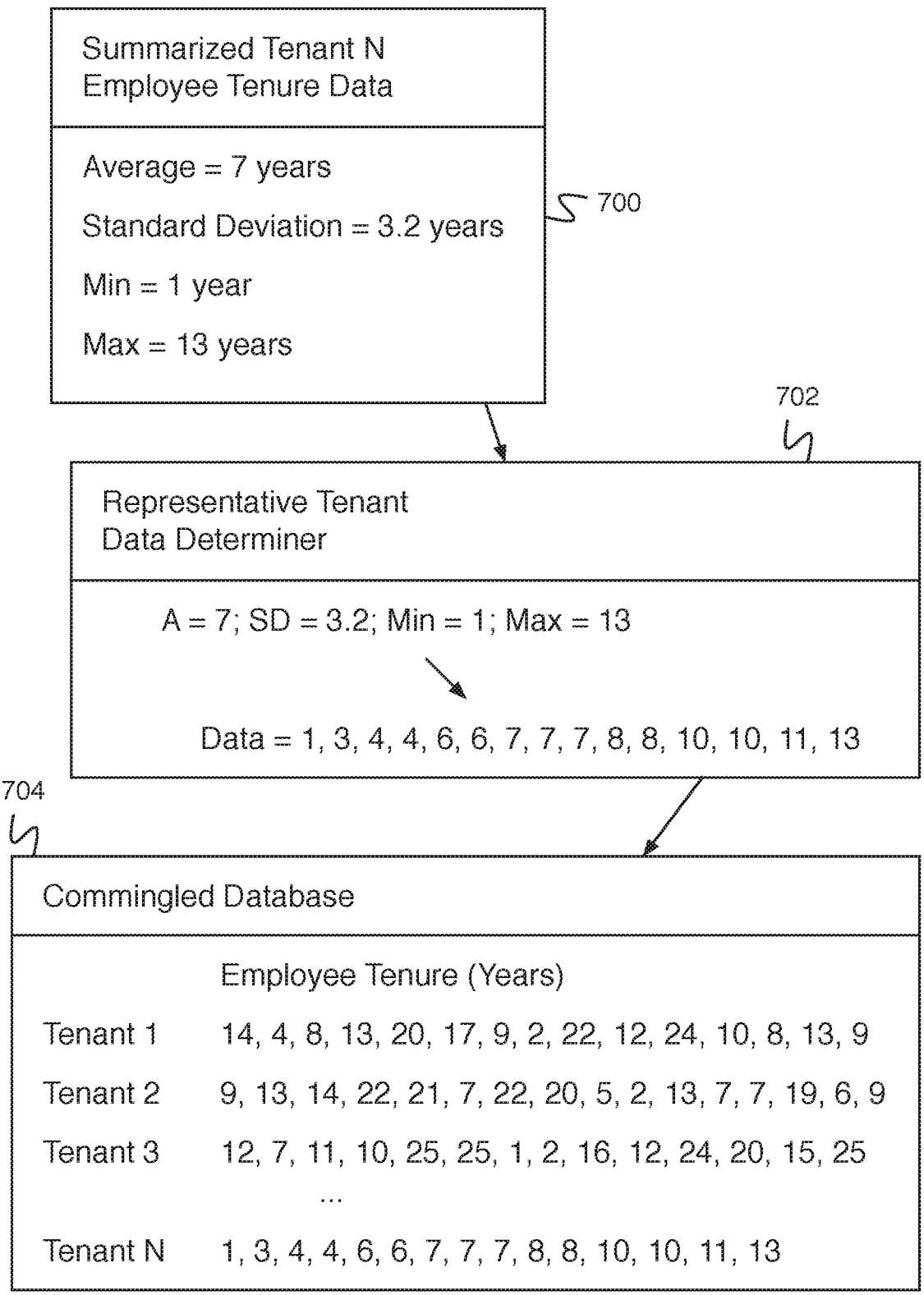
FIG. 7 is a diagram illustrating an embodiment of an addition of summarized data to a commingled database.

FIG. 7 is a diagram illustrating an embodiment of an addition of summarized data to a commingled database. In the example shown, summarized tenant N employee tenure data 700 is received. Summarized tenant N employee tenure data comprises employee tenure data received from tenant N that has been summarized by tenant N before it was provided (e.g., in order to give privacy to tenant N). Summarized tenant N data comprises a set of statistical values for the employee tenure data (e.g., average=7 years, standard deviation=3.2 years, min=1 year, max=13 years). Representative tenant data determiner 702 receives the summarized tenant data and determines a set of representative tenant data corresponding to the summarized tenant data (e.g., representative tenant data that, when summarized using the summarization function used to determine summarized tenant N employee tenure data 700, produces the same summarized data). The set of representative data comprises 1, 3, 4, 4, 6, 6, 7, 7, 7, 8, 8, 10, 10, 11, and 13. The representative tenant data is provided to commingled database 704, where it is added to the employee tenure database. In some embodiments, other summarized data is provided to representative tenant data determiner 702—for example, a number of samples, average, median, standard deviation, confidence, skewness, variance, moment, quartile distribution, quintile distribution, or any other appropriate summary.

Figure 8:
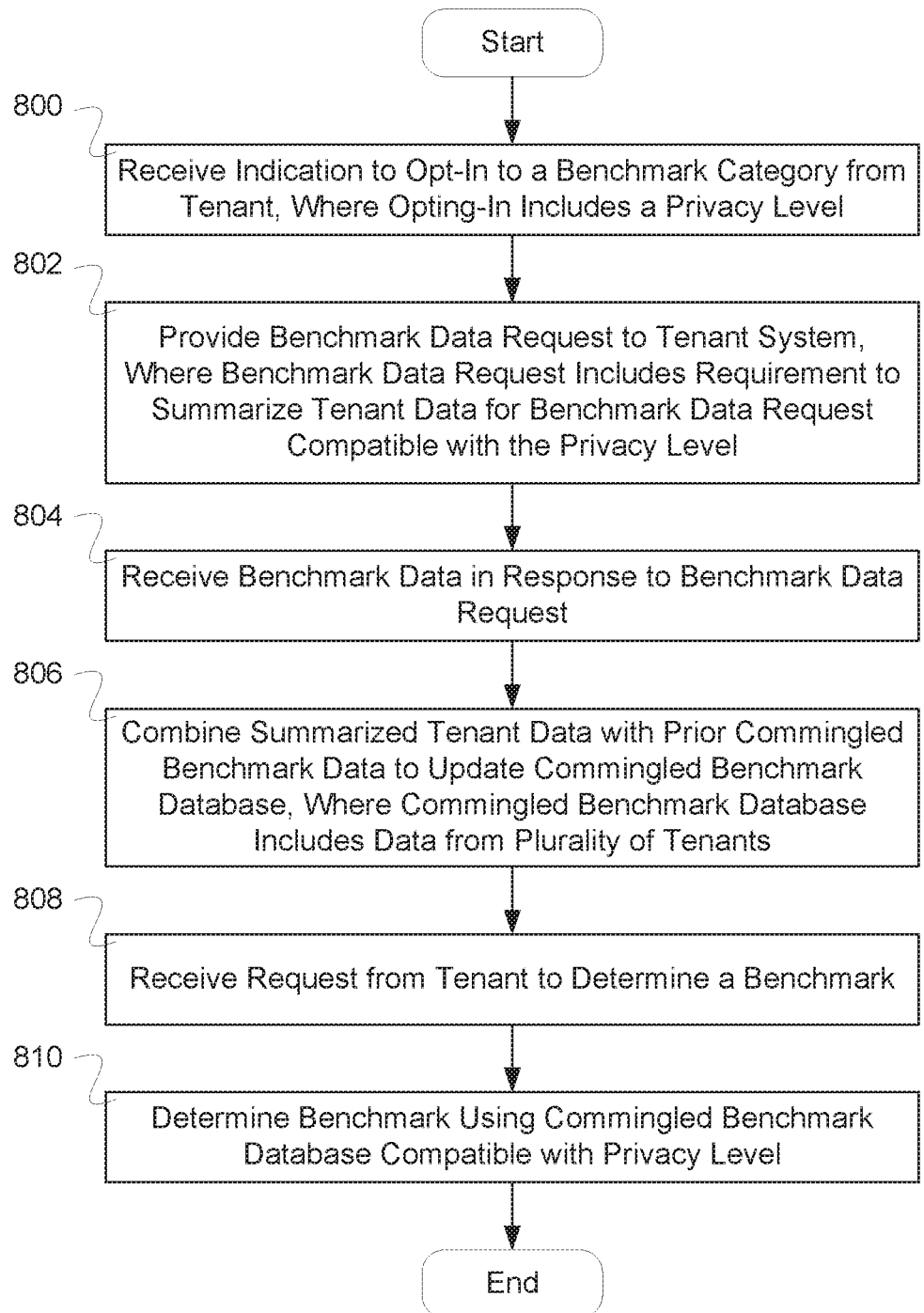
FIG. 8 is a flow diagram illustrating an embodiment of a process for summary based privacy security for benchmarking.

FIG. 8 is a flow diagram illustrating an embodiment of a process for summary based privacy security for benchmarking. In some embodiments, the process of FIG. 8 is executed by a secure data commingler (e.g., secure data commingler 206 of FIG. 2). In the example shown, in 800, an indication is received to opt-in to a benchmark category from a tenant, wherein opting-in includes a privacy level. In 802, a benchmark data request is provided to a tenant system, wherein the benchmark data request includes a requirement to summarize tenant data for the benchmark data request compatible with the privacy level. In 804, benchmark data is received in response to the request. In 806, the summarized tenant data is combined with prior commingled benchmark data to update a commingled benchmark database, wherein the commingled benchmark database includes data from a plurality of tenants. In 808, a request is received from the tenant to determine a benchmark. The benchmark request includes a benchmark request category, and the tenant has a privacy level associated with the benchmark request category. In 808, a benchmark is determined using the commingled benchmark database compatible with the privacy level.

In various embodiments, the privacy level comprises a level of grouping, a statistic type, and/or a granularity level for the benchmark category. In some embodiments, the level of grouping for the benchmark request category comprises one or more of: employee job title, employee location, state level data, region level data, city level data, country level data. In some embodiments, the privacy level (e.g., the granularity level) is stored.

Figure 9:
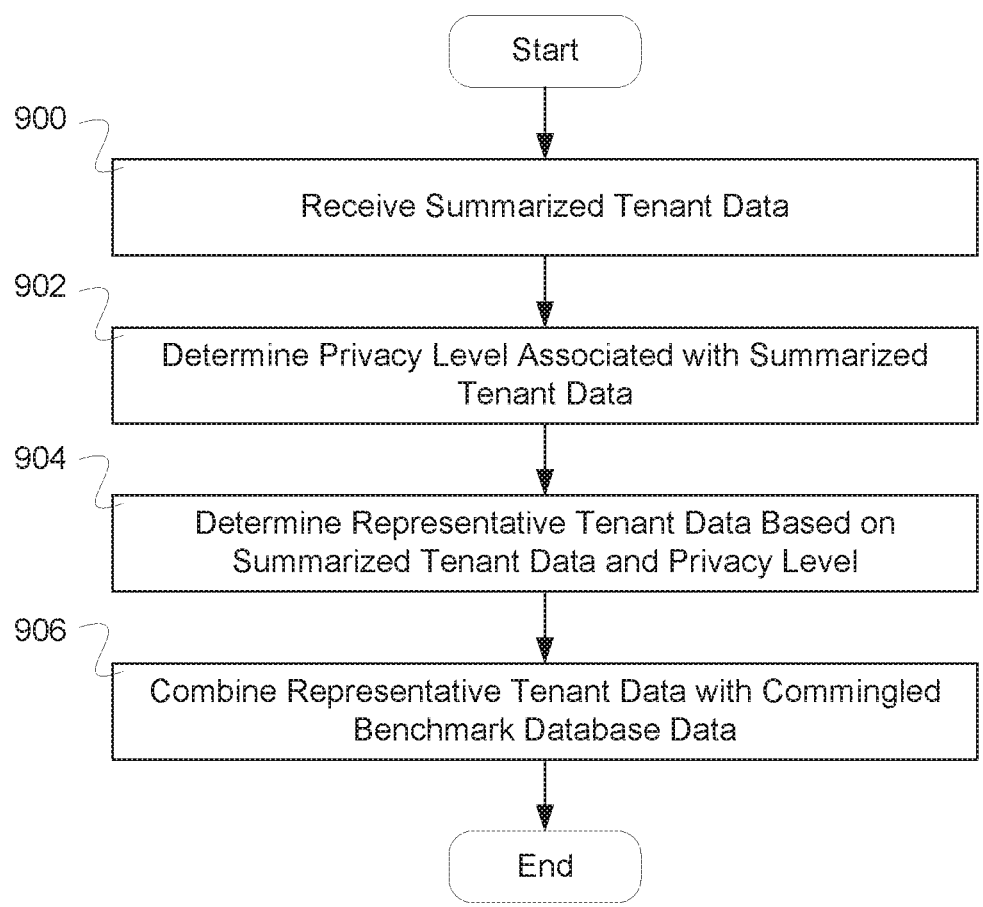
FIG. 9 is a flow diagram illustrating an embodiment of a process for combining summarized tenant data with prior commingled benchmark data to update a commingled benchmark database.

FIG. 9 is a flow diagram illustrating an embodiment of a process for combining summarized tenant data with prior commingled benchmark data to update a commingled benchmark database. In some embodiments, the process of FIG. 9 implements 806 of FIG. 8. In the example shown, in 900, summarized tenant data is received. In 902, a privacy level associated with the benchmark data is determined. A privacy level indicates a summarization function that has been applied to the benchmark data. In 904, representative tenant data is determined based on the summarized tenant data and the privacy level. In 906, the representative tenant data is combined with the commingled benchmark database data (e.g., added to the commingled benchmark database data as a new row or set of rows, added to the commingled benchmark database data as a new set of data objects, etc.).

Figure 10:
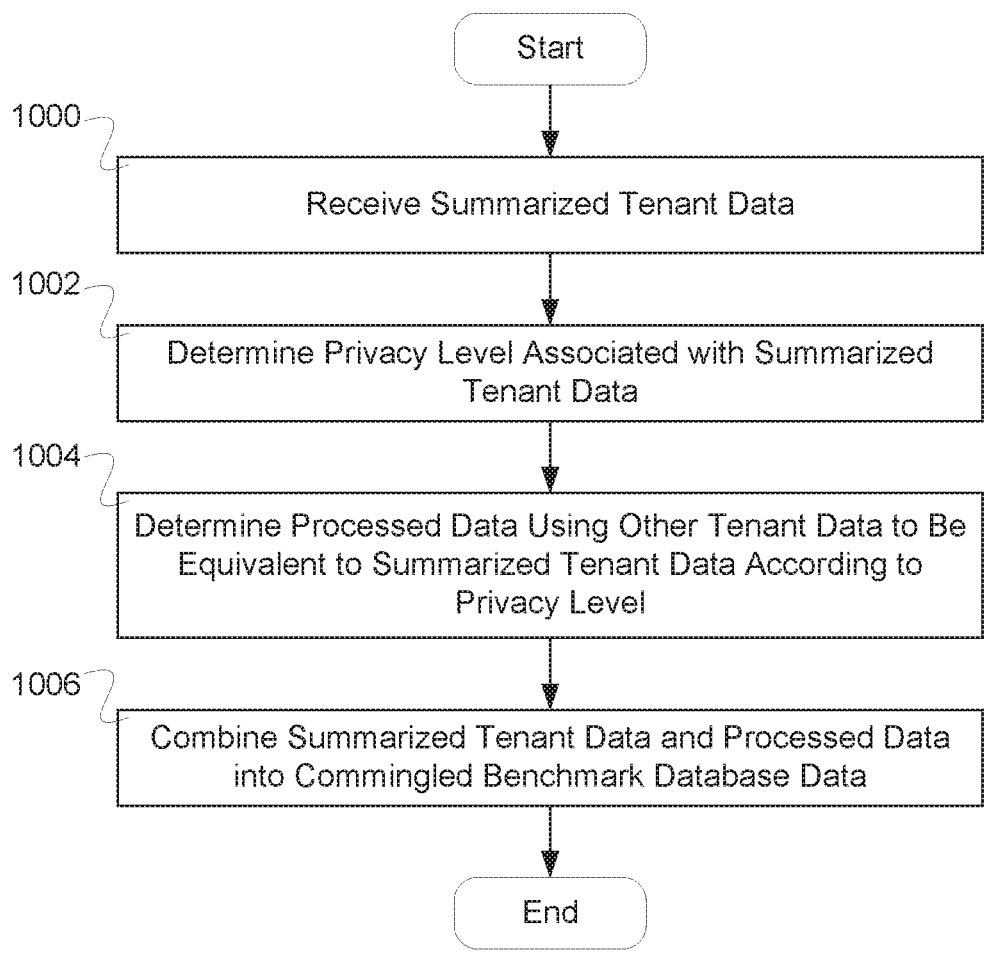
FIG. 10 is a flow diagram illustrating an embodiment of a process for combining benchmark data with prior commingled benchmark data to update a commingled benchmark database.

FIG. 10 is a flow diagram illustrating an embodiment of a process for combining benchmark data with prior commingled benchmark data to update a commingled benchmark database. In some embodiments, the process of FIG. 10 implements 806 of FIG. 8. In the example shown, in 1000, summarized tenant data is received. In 1002, a privacy level associated with the summarized tenant data is determined. In 1004, processed data is determined using other tenant data to be equivalent to summarized tenant data according to the privacy level. For example, the summarized tenant data is further summarized or combined with other commingled data to generate processed data. In 1006, the processed data and summarized tenant data is combined with the commingled benchmark database data (e.g., added to the commingled benchmark database data as a new row or set of rows, added to the commingled benchmark database data as a new set of data objects, etc.).

Figure 11:
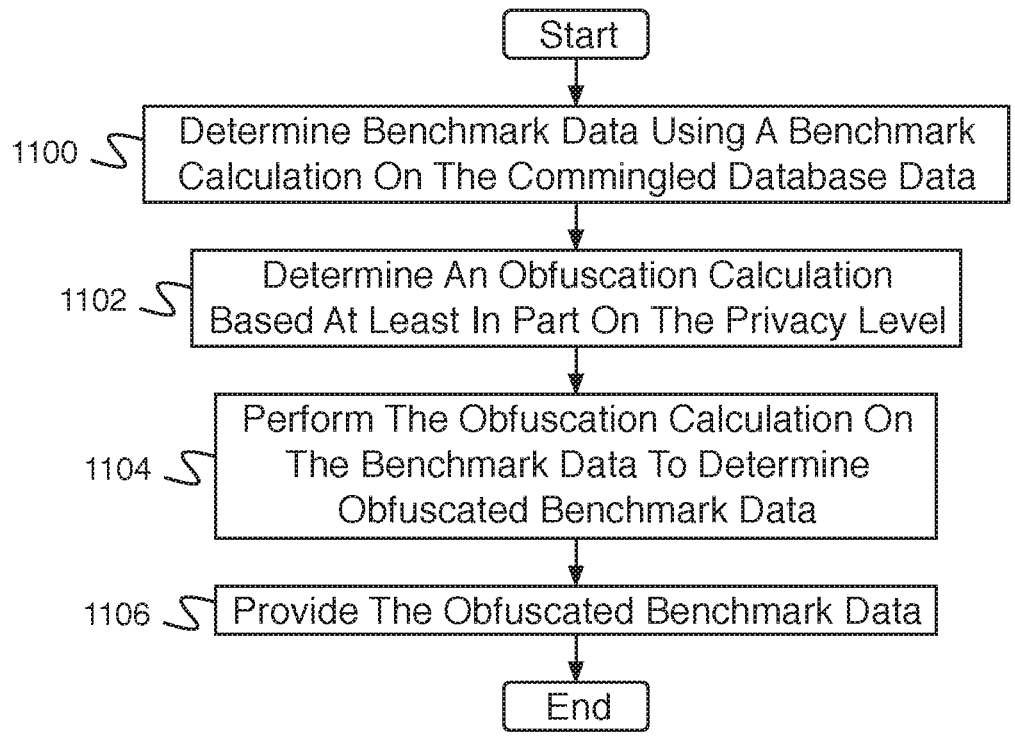
FIG. 11 is a flow diagram illustrating an embodiment of a process for determining a benchmark using the commingled benchmark database compatible with the privacy level.

FIG. 11 is a flow diagram illustrating an embodiment of a process for determining a benchmark using the commingled benchmark database compatible with the privacy level. In some embodiments, the process of FIG. 11 implements 810 of FIG. 8. In the example shown, in 1100, benchmark data is determined using a benchmark calculation on the commingled database data. In 1102, an obfuscation calculation is determined based at least in part on the privacy level. In 1104, the obfuscation calculation is performed on the benchmark data to determine obfuscated benchmark data. In 1106, the obfuscated benchmark data is provided.

In some embodiments, obfuscation can be implemented by calculating the returned benchmark results at the same privacy level as the tenant's contribution. So if the tenant only contributes their mean (privacy level 5), they will only get a benchmark based on other tenant's contributed means.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for summary based privacy security for benchmarks, comprising:
    an interface configured to:
    receive an indication to opt-into a benchmark category from a tenant, wherein opting-in includes a privacy level; and
    provide a benchmark data request to a tenant system, wherein the benchmark data request includes a requirement to summarize tenant data for the benchmark data request to reduce detail in the tenant data compatible with the privacy level to obtain summarized tenant data: and
    a processor configured to:
    combine the summarized tenant data with prior commingled benchmark data to obtain an updated commingled benchmark database, wherein the prior commingled benchmark data includes data from a plurality of tenants;
    determine a benchmark compatible with the privacy level using the updated commingled benchmark database; and
    wherein determining the benchmark comprises: determining benchmark report data using the updated commingled benchmark database; and performing an obfuscation calculation on the benchmark report data to reduce detail in the benchmark report data compatible with the privacy level to obtain obfuscated benchmark report data.

2. The system of claim 1, wherein the interface is further configured to receive the summarized tenant data.

3. The system of claim 1, wherein the interface is further configured to receive a benchmark request to determine the benchmark from the tenant, wherein the tenant has the privacy level associated with the benchmark category.

4. The system of claim 3, wherein the privacy level comprises a level of grouping for the benchmark category.

5. The system of claim 4, wherein the level of grouping for the benchmark category comprises one or more of: employee job title, employee location, state level data, region level data, city level data, and country level data.

6. The system of claim 3, wherein the privacy level comprises a statistic type.

7. The system of claim 6, wherein the statistic type comprises one or more of: a mean, a mean and standard deviation, a mean and quartile values, and a mean and decile values.

8. The system of claim 1, wherein summarizing tenant data comprises performing a calculation based at least in part on the privacy level.

9. The system of claim 1, wherein combining the summarized tenant data with the prior commingled benchmark data comprises determining a set of representative tenant data based at least in part on the summarized tenant data.

10. The system of claim 9, wherein the set of representative tenant data comprises data that produces the summarized tenant data when summarized.

11. The system of claim 10, wherein the set of representative tenant data comprises data that produces the summarized tenant data when one of the following statistics is determined: a mean, a mean and standard deviation, a mean and quartile values, or a mean and decile values.

12. The system of claim 1, wherein combining the summarized tenant data with the prior commingled benchmark data comprises summarizing a combined benchmark data.

13. The system of claim 12, wherein combining the benchmark data with the prior commingled benchmark data comprises summarizing the combined benchmark data using one of: a mean, a mean and standard deviation, a mean and quartile values, or a mean and decile values.

14. The system of claim 1, wherein the processor is additionally configured to store in the updated commingled benchmark database an indication of a level of granularity associated with a stored combined benchmark data.

15. The system of claim 14, wherein the processor is additionally configured to provide the stored combined benchmark data as the benchmark.

16. The system of claim 1, wherein determining the benchmark further comprises determining the obfuscation calculation based at least in part on the privacy level.

17. A method for summary based privacy security for benchmarks, comprising:
    receiving an indication to opt-in to a benchmark category from a tenant, wherein opting-in includes a privacy level;
    providing a benchmark data request to a tenant system, wherein the benchmark data request includes a requirement to summarize tenant data for the benchmark data request to reduce detail in the tenant data compatible with the privacy level to obtain summarized tenant data;
    combining, using a processor, the summarized tenant data with prior commingled benchmark data to obtain an updated commingled benchmark database, wherein the prior commingled benchmark data includes data from a plurality of tenants;
    determining a benchmark compatible with the privacy level using the updated commingled benchmark database; and
    wherein determining the benchmark comprises: determining benchmark report data using the updated commingled benchmark database; and performing an obfuscation calculation on the benchmark report data to reduce detail in the benchmark report data compatible with the privacy level to obtain obfuscated benchmark report data.

18. A non-transitory computer program product for summary based privacy security for benchmarks, the computer program product being embodied in a computer readable storage medium and comprising computer instructions for execution by a processor for:
- receiving an indication to opt-into a benchmark category from a tenant, wherein opting-in includes a privacy level;
- providing a benchmark data request to a tenant system, wherein the benchmark data request includes a requirement to summarize tenant data for the benchmark data request to reduce detail in the tenant data compatible with the privacy level to obtain summarized tenant data;
- combining the summarized tenant data with prior commingled benchmark data to obtain an updated commingled benchmark database, wherein the prior commingled benchmark data includes data from a plurality of tenants;
- determining a benchmark compatible with the privacy level using the updated commingled benchmark database; and
- wherein determining the benchmark comprises: determining benchmark report data using the updated commingled benchmark database; and performing an obfuscation calculation on the benchmark report data to reduce detail in the benchmark report data compatible with the privacy level to obtain obfuscated benchmark report data.

* * * * *